(12) United States Patent
Walsh et al.

(10) Patent No.: US 6,419,055 B1
(45) Date of Patent: Jul. 16, 2002

(54) VARIABLE-ATTITUDE MOUNT FOR BRAKE CONTROLLERS AND THE LIKE

(76) Inventors: John Walsh, 1360 Oakleigh NW., Grand Rapids, MI (US) 49504; Mark Roth, 320 W. 21$^{st}$ St., Holland, MI (US) 49323; Joseph B. Wells, 1710 Plymouth St., Jackson, MI (US) 49203; Jason A. Reichard, 13581 R.S. Ave. East, Scotts, MI (US) 49088

(*) Notice: Subject to any disclaimer, the term of this patent is extended or adjusted under 35 U.S.C. 154(b) by 0 days.

(21) Appl. No.: 09/450,411

(22) Filed: Nov. 29, 1999

Related U.S. Application Data

(60) Provisional application No. 60/110,235, filed on Nov. 30, 1998.

(51) Int. Cl.$^7$ ............................................. F16D 65/14
(52) U.S. Cl. ................. 188/206 R; D12/179; 248/176.1
(58) Field of Search ................. 188/206 R, 205 R, 188/3 R, 213, 181 R; 303/7, 20, 24.1; 280/750, 752, 770; D13/162, 164; D12/174, 179, 192; 248/176.1, 176.3

(56) References Cited

U.S. PATENT DOCUMENTS

| | | |
|---|---|---|
| 823,579 A | 6/1906 | Beyland |
| 1,455,784 A | 5/1923 | Godley |
| 2,500,784 A | 3/1950 | Anderson, Jr. |
| D199,904 S | 12/1964 | Nunn, Jr. |
| D215,158 S | 9/1969 | Ozaki |
| 3,477,678 A | 11/1969 | Icke et al. |
| 3,738,710 A | 6/1973 | Pokrinchak et al. |
| 3,780,832 A * | 12/1973 | Marshall ..................... 188/3 R |
| 3,897,979 A * | 8/1975 | Vangalis et al. ......... 188/3 R X |
| 3,909,075 A | 9/1975 | Pittet, Jr. et al. |
| 3,953,084 A | 4/1976 | Pittet, Jr. et al. |
| 3,967,863 A | 7/1976 | Tomecek et al. |
| 3,981,544 A | 9/1976 | Tomecek et al. |
| 4,019,710 A | 4/1977 | O'Connor et al. |
| 4,030,756 A | 6/1977 | Eden |
| D257,973 S | 1/1981 | Reid |
| 4,681,991 A | 7/1987 | Anderson |
| 4,986,503 A | 1/1991 | Kabat |
| D322,426 S | 12/1991 | Austin |
| 5,145,137 A | 9/1992 | Choi |
| D331,226 S | 11/1992 | Austin |
| 5,322,255 A * | 6/1994 | Garrett ....................... 248/299 |
| 5,333,948 A | 8/1994 | Austin et al. |
| D356,298 S * | 3/1995 | Austin ....................... D13/162 |
| 5,398,901 A | 3/1995 | Brodmann et al. |
| 5,404,682 A | 4/1995 | West |
| D362,659 S | 9/1995 | Hedding et al. |
| D378,511 S * | 3/1997 | Austin ....................... D13/162 |
| 5,615,930 A * | 4/1997 | McGrath et al. ............... 303/7 |
| 5,664,752 A | 9/1997 | Matthiessen et al. |
| 5,700,068 A * | 12/1997 | Austin ....................... 303/24.1 |
| D392,604 S * | 3/1998 | Wright et al. .............. D12/126 |
| 5,832,840 A | 11/1998 | Woof |
| D404,365 S | 1/1999 | Robertson et al. |
| D407,694 S | 4/1999 | Hill et al. |
| D418,822 S | 1/2000 | Worley |
| D433,387 S | 11/2000 | Roth et al. |
| D434,391 S * | 11/2000 | Roth et al. ................. D13/162 |

* cited by examiner

Primary Examiner—Pam Rodriguez
(74) Attorney, Agent, or Firm—Price, Heneveld, Coope DeWitt & Litton

(57) ABSTRACT

A positioner member having a spherically curved wall with an opening through it, a receiver having a surface complementary to the curved wall to nestably interfit with it, a releasable locking member disposed behind the curved wall, and an elongated connector member extending from the receiver through the opening in the curved wall and into engagement with the locking member to permit tightening and loosening of the positioner and receiver, whereby they may be moved relative to one another in a three-dimensionally orbital manner when the connector and locking element are loosened but immovably clamped when these two elements are tightened. The positioner member is attachable to a desired external support such as an automobile dashboard, and the receiver is attachable to a brake controller or other such device. The receiver may be integral with the brake controller, formed in or attached to a side thereof.

37 Claims, 4 Drawing Sheets

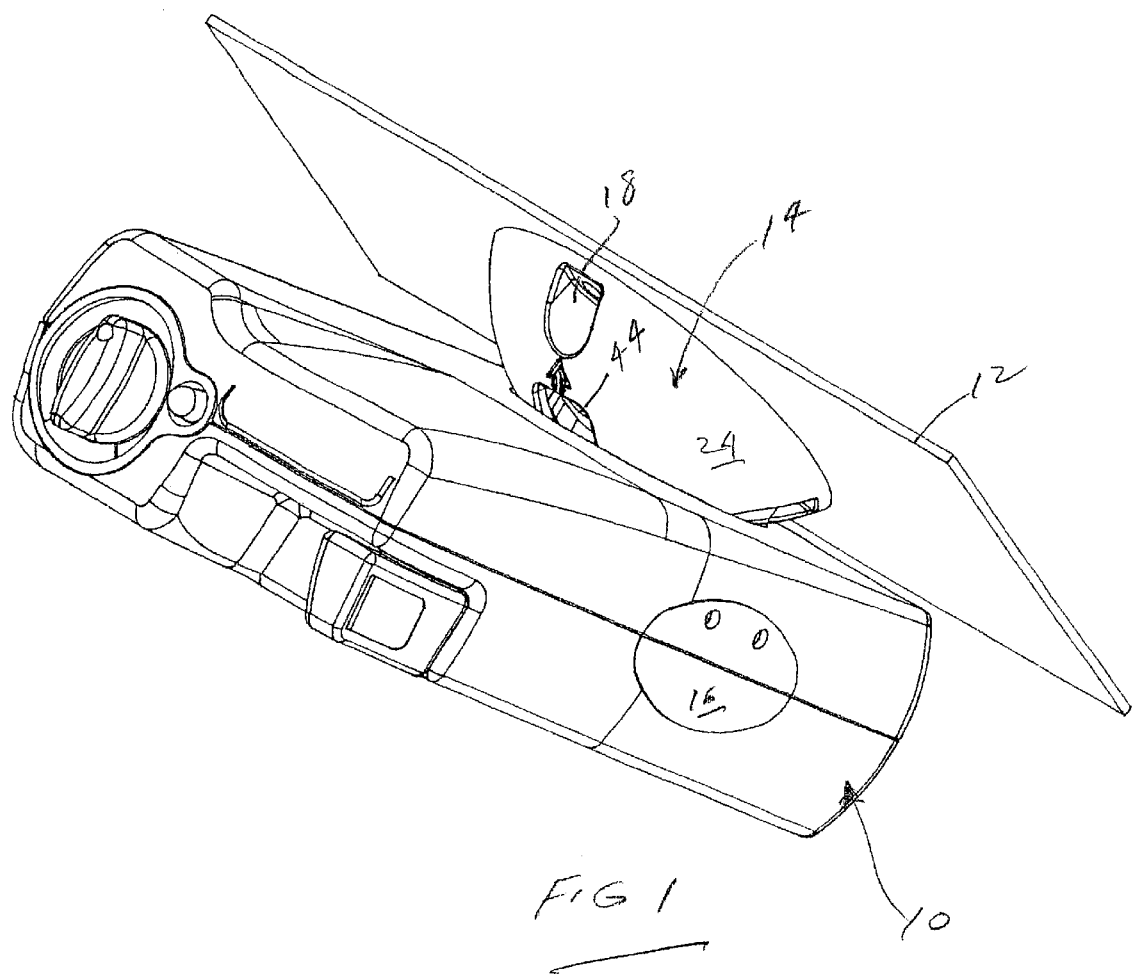

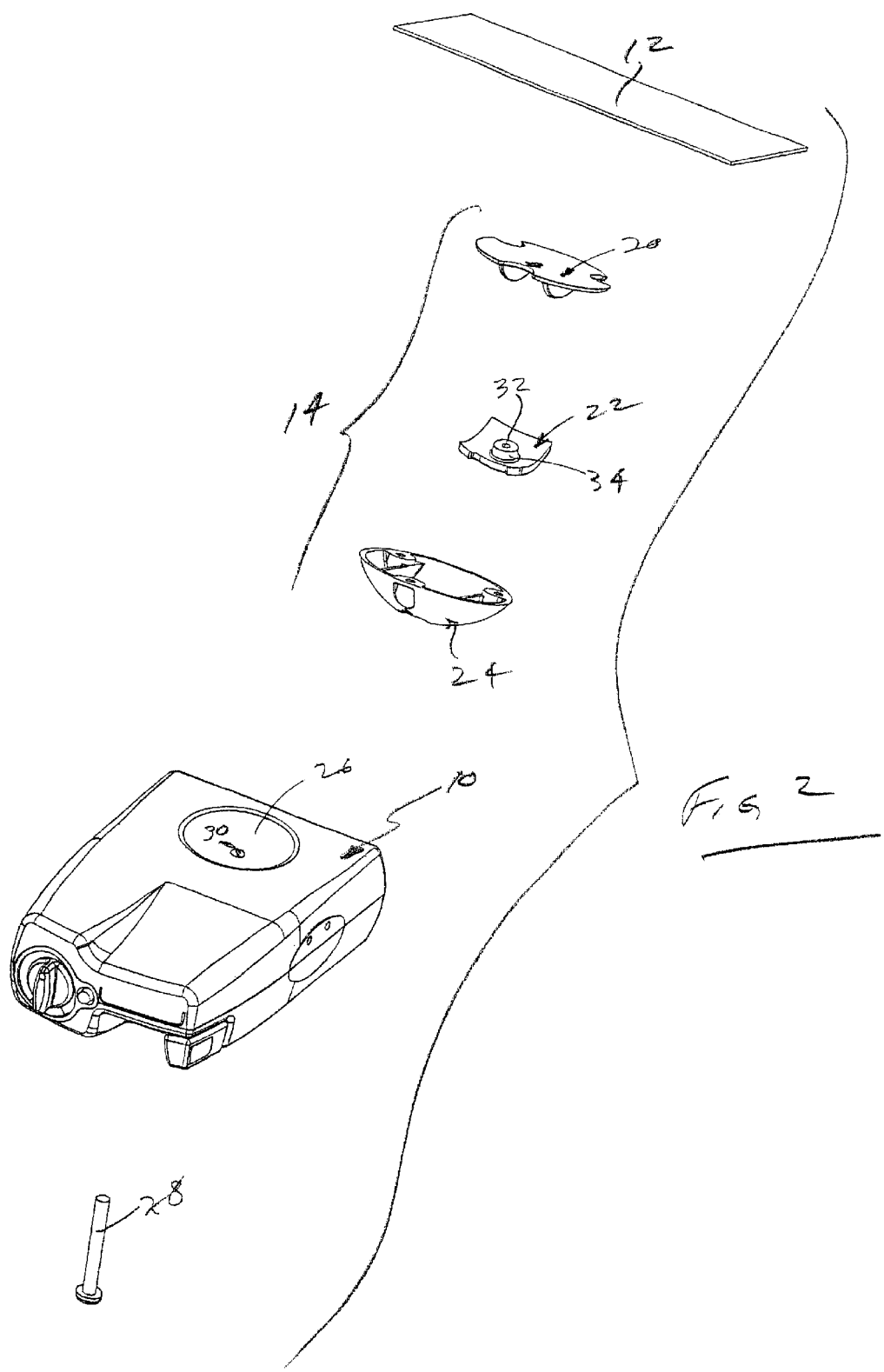

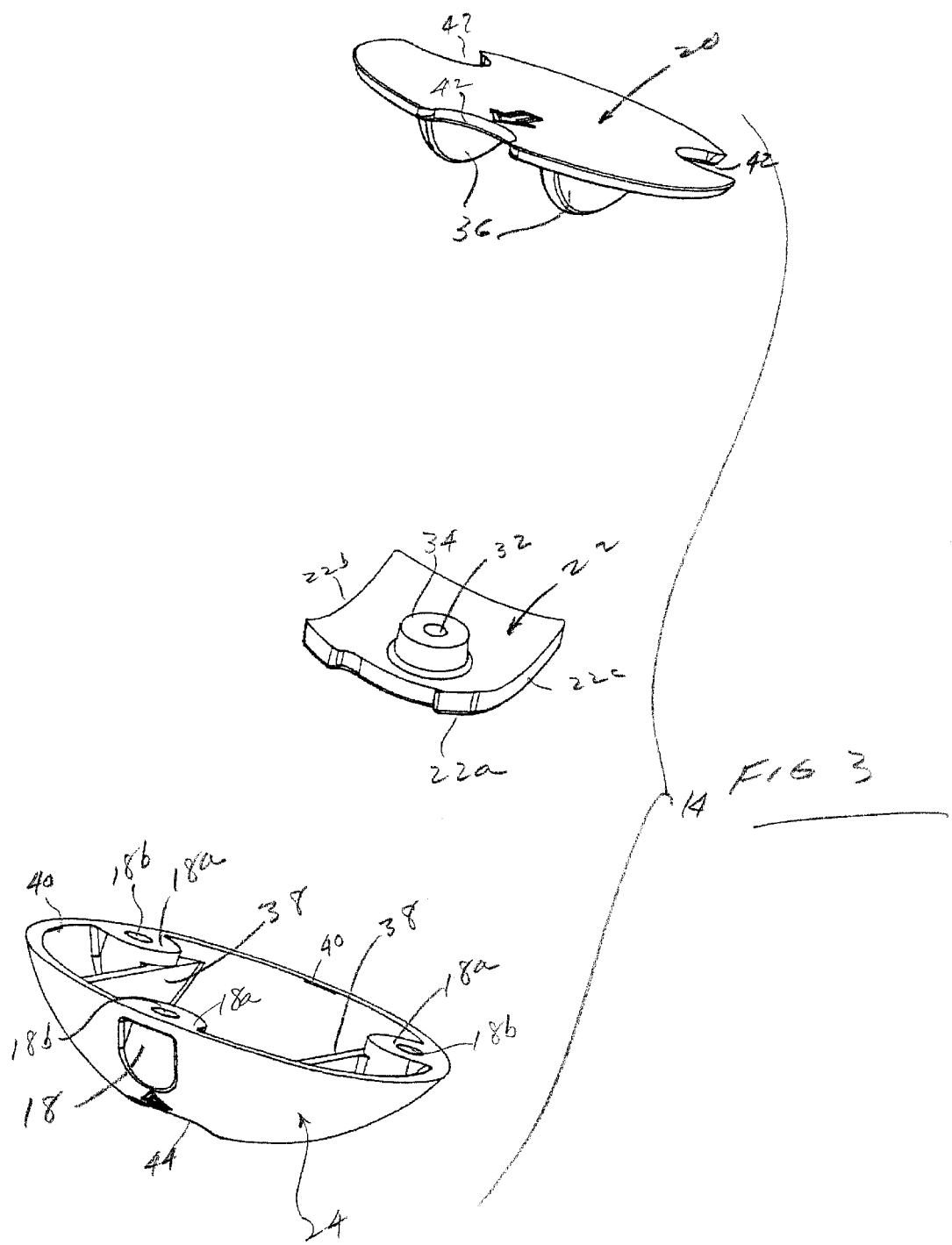

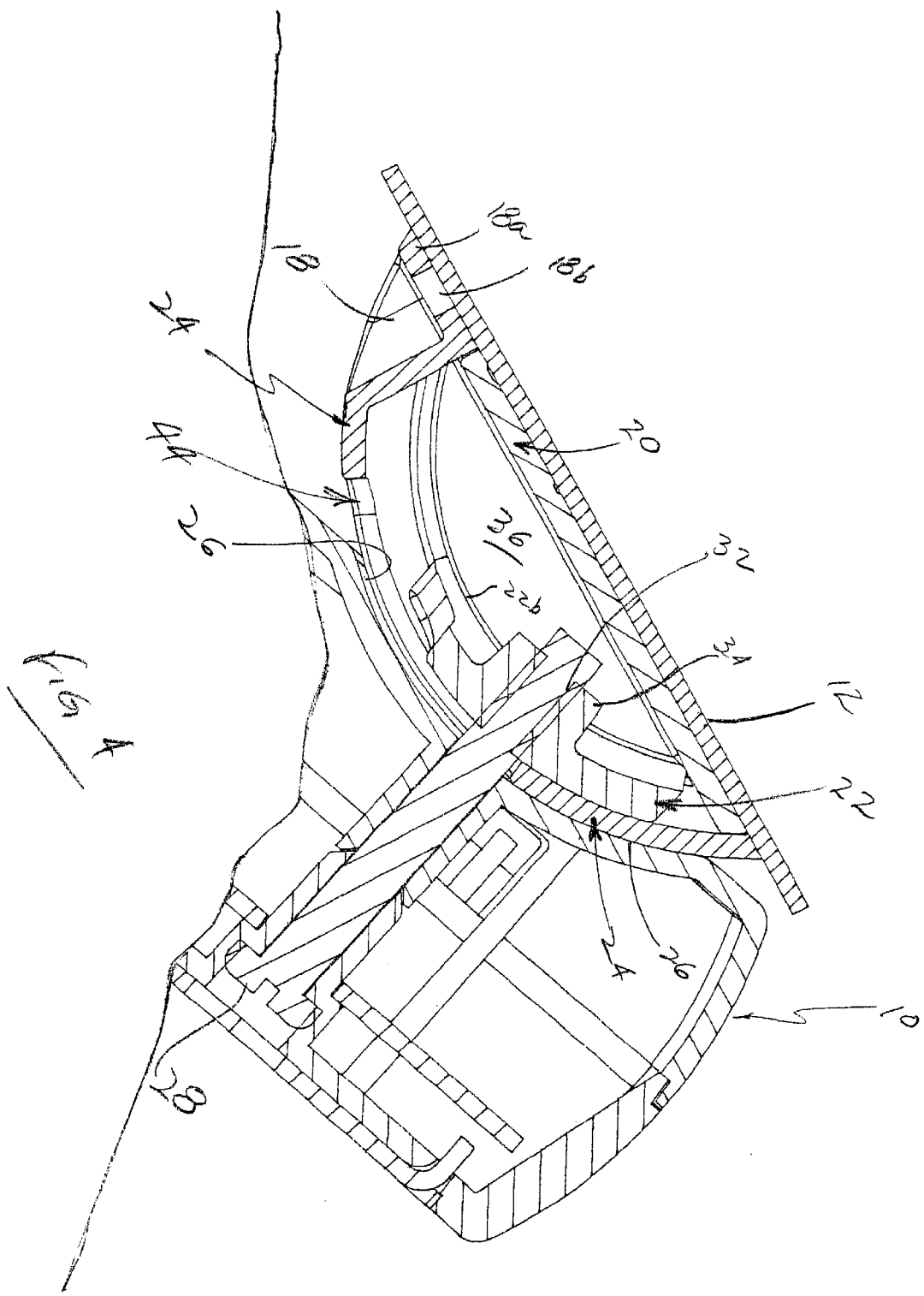

VARIABLE-ATTITUDE MOUNT FOR BRAKE CONTROLLERS AND THE LIKE

CROSS-REFERENCE TO RELATED APPLICATION

This application claims the benefit of U.S. Provisional Application No. 60/110,235 filed Nov. 30, 1998, the entire contents of which are hereby incorporated herein by reference.

FIELD OF THE INVENTION

This invention relates generally to variable-attitude mounting devices or mechanisms, which are used to hold a desired object in one or more selected positions for use by an operator, and in a more particular sense relates to a variable-attitude or "universal" type mounting device for operator-controllable devices, for example controllers for actuating and controlling vehicle brakes, especially electrically-actuated brakes on a towed vehicle such as a trailer.

BACKGROUND

In the past, towed vehicle brake controllers (as well as other such hand-operated devices) have typically been mounted in operating position by using either a very simple bracket or other such mounting device or by a direct-mounting means such as adhesive or velcro, etc., which held the controller or other such device in a fixed position once applied or installed. In more recent times, simple pivot mounts have come into use which permit adjustment in at least one axis; usually, by utilizing a generally U-shaped yoke or clevice mount to which the controller is attached at mutually opposite points along its sides, thus providing an upwardly and downwardly tiltable mount which enables the user to correspondingly adjust the operating position of the controller to at least some extent, in order to make it more convenient. Other such known mounting devices have included a slide mechanism which permits the controller and/or the U-shaped holder to be raised or lowered as well as tilted, thereby providing a certain additional amount of operational flexibility.

Although there has been this limited amount of progress over time, none of the aforementioned devices have provided optimal position-selection capability for the operator, since the degree and range of motion they provide is so relatively limited. Furthermore, these prior art devices and methods have left a great deal to be desired from the standpoint of appearance as well as that of functionality, since most of them have been relatively unattractive mechanical devices, often made from simple metal stampings or the like.

Accordingly, the prior art has not provided mounts for brake controllers or the like which were either attractive or which permitted multi-directional positioning of the controller, and this last-mentioned shortcoming has made it increasingly unlikely that the vehicle operator will be able to orient the controller in the particular position needed for optimum performance. That is, since many such controllers include a gravitationally affected inertia sensor for detecting momentum changes associated with vehicle braking, these controllers require particular positioning attitudes which must be within a specified range of verticality for proper operation. With the increasingly complex shapes of automotive dashboards which continue to occur, it becomes increasingly difficult to find an appropriate mounting site for the controller which will provide the desired operational positioning, particularly if the known types of mounts are used since this requires, ready and uncomplicated access to the operator for manual adjustment and operation, freedom from interference or interaction with other automotive controls or the like in the area, positioning which is not objectionably prominent, and a shape and surface configuration which permits the necessary functional orientation for the inertial sensor, etc.

BRIEF SUMMARY OF THE INVENTION

The present invention provides a substantial and desirable step forward in the art in comparison to conventional mounting devices such as those referred to above. This is accomplished by providing an adjustable mounting structure or mechanism which will securely hold the controller or other such device in a particular position which is selected from a practically unlimited number of possible such positions, achieved through allowable motion of the controller/device in both pitch and yaw axes as well as about both a pivot axis and a translational axis.

Trailer brake controllers are located in and operated from the towing vehicles, and are usually mounted on or near the dashboard. The present invention provides a new form of variable-attitude, selectable-position mounting device for brake controllers and other such devices which easily and readily lends itself to optimal controller positioning on practically any dashboard shape, and it does so in a most economical and easily-manufacturable manner, utilizing a minimum of parts which are readily and economically manufacturable and which require only minimal assembly time while require virtually no subsequent maintenance and involve essentially no likelihood of subsequent malfunction or failure.

In addition to the foregoing objectives and advantages, the present invention provides a new form and type of adjustably positionable mount for brake controllers and the like which provides an aesthetic and attractive exterior appearance, and which lends itself to direct integration with the controller or other such device which it is being used to position, by conformably configuring the adjacent surface of the controller, or by utilizing a simple, inexpensively manufactured and easily implemented adapter device to be disposed therebetween.

The foregoing principal aspects and features of the invention will become better understood upon review of the ensuing specification and the attached drawings, describing and illustrating preferred embodiments of the invention.

BRIEF DESCRIPTION OF FIGURES

FIG. 1 is a perspective view showing a brake controller mounted beneath a surface in accordance with a preferred embodiment of the invention;

FIG. 2 is an exploded perspective thereof;

FIG. 3 is an enlarged exploded perspective of the mount alone, shown apart from the controller and mounting surface; and FIG. 4 is a further enlarged, fragmentary sectional side elevational view showing the apparatus of FIGS. 1 and 2.

DESCRIPTION OF PREFERRED EMBODIMENTS

The basic nature of a preferred form of mounting apparatus in accordance with the invention is illustratively depicted in FIG. 1, in which a controller 10 is suspended beneath a support surface 12 (for example, part of an automotive dashboard) by the mounting apparatus 14. While the device to be mounted by use of the invention may in a broad sense be essentially any operator-controllable device of most any shape and particular type, the controller 10 may be regarded as a typical example of a trailer brake controller used in the automotive field. As described further below, however, the particular controller 10 illustrated herein does include at least one special attribute which allows it to be in effect integrated with the mounting apparatus 14. As illustrated in FIG. 1, however, the controller 10 is shown to additionally include a basically conventional form of pivot mounting pad 16 disposed along the side nearest the viewer, it being understood that a complementary such pivot pad will also be provided on the opposite such side, both being for use with conventional pivot-type mounts as described above, if and where desired. When the preferred mounting apparatus 14 is utilized, the pivot pads 16 are unnecessary.

As generally seen in FIG. 1, the mounting apparatus 14 has a semi or partially spherical dome-like exterior portion, and includes a plurality of attachment recesses 18 which enable attachment of the mounting apparatus to the support surface 12 by use of mechanical fasteners such as screws or the like. As indicated below, other types of attachment means are also readily accommodated by the apparatus 14.

FIG. 2 shows the apparatus of FIG. 1 in exploded form, in which it will be seen that the mounting apparatus 14 basically comprises only three parts, i.e., a disk-like base 20, an interior slide element 22 (sometimes referred to as a locking element), and an outer shell 24 which comprises a segment of a spherically shaped basically hollow member (sometimes referred to as a positioner member). As generally illustrated in FIG. 1 and as described further below, the base 20, slide/locking element 22, and positioner member/outer shell 24 fit together in a nestable manner to provide a unitary operating device having a generally flat (or other desired configuration) surface on one side (i.e., the bottom side of base 20, shown closest to support surface 12) and a spherically configured opposite side (i.e., the outer surface of shell 24).

The spherically configured exterior of outer shell 24 fits conformably into a corresponding recess 26 in the adjacent surface of controller 10 (sometimes referred to as a receiver), preferably by providing smoothly slidable and correspondingly spherical surfaces on each which smoothly interfit with one another and thus provide numerous points of mutual contact. Of course, a simple circular opening would also serve to receive the spherical outer shell 24, but would only contact it along an annular series of points. Broadly considered, either such receiver configuration would constitute a "recess," however.

The assembled mounting apparatus 14 is held in place against the adjacent surface of controller 10 by an elongated connector 28 such as a machine screw or bolt, which protrudes outwardly through an appropriately sized aperture 30 at the bottom of spherical recess 26 (entering from the opposite side of the controller 10 and extending through a passage therebetween). Connector 28 engages a correspondingly sized and internally threaded aperture 32 that extends through slide/locking element 22 (preferably, through a hub-like thickened portion 34 of the latter, provided for additional strength).

The component parts of mounting apparatus 14, i.e., base 20, slide element 22, and positioner member 24, are illustrated in more detail in FIG. 3, in which it may more clearly be seen that base 20 has a pair of mutually parallel, downwardly depending wall-like guide members 36, which extend outwardly from its otherwise-flat lower surface to provide guide rails for the sides of slide element 22. More particularly, guide members 36 preferably have a circularly configured outer perimeter which is sized to closely interfit with the concave inside surface of outer shell 24, between and immediately adjacent a pair of corresponding walls 38 formed inside shell 24 and extending from its concave inside surface to the plane of the perimetral opening at the base of the latter.

Slide/locking element 22, as noted above, mounts inside the positioner member/outer shell 24, and is disposed between the projecting guide rail members or walls 36 of base 20 when the latter is in place covering the open base extremity of shell 24. It should be noted that the bottom surface 22A (as shown in FIGS. 2 and 3) of slide element 22 is spherically configured, and sized to fit conformably against the concave interior surface of outer shell 24, against and with respect to which it may therefore readily slide. This sliding movement would therefore define a three-dimensional orbital movement of positioner member 24 if unrestrained; however, the sides 22B, 22C of slide element 22 comprise basically parallel edges which are sized to fit closely but slidably between the depending guide walls or rails 36 of base 20 when the latter is at the base of positioner member 24, in effect closing the open bottom thereof. Consequently, movement of slide element 22 is basically constrained to a rocking-type action, along guide walls or rails 36.

Preferably, outer shell 24 is formed to have a plurality of annularly spaced ridge portions 40 (FIG. 3) which extend toward one another in a common plane from along the inside edge of its open bottom perimeter, and the size relationship between shell 24 and base 20 is such that base 20 may be snapped into place, with ridges 40 holding the two components together (with slide element 22 slidably disposed inside shell 24). As noted previously, shell 24 preferably or desirably includes a plurality of mutually spaced attachment structures, e.g., recesses 18, which comprise cylindrically-shaped wall segments defining correspondingly shaped generally tubular recesses in the otherwise-spherical outer wall of shell 24, together with corresponding co-planar base walls 18A having apertures 18B through which screws or the like may be extended to secure the assembled mounting apparatus 14 onto a desired support surface such as that shown at 12. In order to complement and accommodate this feature, semicircular recesses 42 are preferably provided at appropriate corresponding locations around the exterior periphery of base 20. As will be understood, a variety of other means could be used to secure the assembled mounting apparatus 14 onto a support surface, including adhesives, velcro, etc., which could be used between the flat bottom surface of base 20 and the selected exterior support surface. Consequently, base 20 may also be deemed an attachment structure, or part of one. As will also be understood by those skilled in the art, the three major components (base 20, slide 22, and shell 24) may all readily be made of polymeric material, and by injection molding or other such techniques.

As noted above, the controller 10 is desirably mounted upon the mounting apparatus 14 by providing a spherically configured recess 26 in its top (or bottom) surface which conformably receives the domed outside surface of shell 24 in a smoothly slidable manner, with an elongated machine screw or bolt 28 that extends through controller 10 from the opposite side and is received into the threaded recess 32 of slide element 22. This relationship is illustrated in FIG. 4, which is a cross-sectional view taken longitudinally through controller 10 and passing through the aperture 30 at the center of its spherical recess 26. As illustrated in FIG. 4 (and as also seen in FIG. 1, and to a lesser degree in FIGS. 2 and 3) the outer shell 24 has a slot 44 of predetermined length which extends through its outer wall and provides access for bolt/screw 28 to engage aperture 32 of slide element 22, inside shell 24. By this structural configuration, slot 44 also accommodates the arcuate sliding, rocker-like relative motion between slide element 22 and outer shell 24, referred to previously. That is, slide element 22 is guided in this rocker-like motion along the spherical inside surface of shell 24 by guide walls or rails 36 of base 20; however, slot 44 and bolt/screw 28 also guide this movement, as well as allowing it to occur and limiting its allowable range, since slot 44 allows bolt/screw 28 to extend through the spherical outer wall of shell 24 and be screwed into aperture 32 of slide member 22, thereby directly connecting the controller 10 to slide member 22.

As will be apparent from the foregoing, the nature and amount of positioning provided for the controller 10 in relation to support surface 12 made possible by operation of mounting apparatus 14 is of a substantially universal nature, and limited only by potential contact of the adjacent surface of controller 10 with the underside of support surface 12 and/or by the relative size and degree of curvature of outer shell 24 and the length of slot of 44. More particularly, controller 10 may be moved to an essentially infinite number of different positions with respect to outer shell 24 by moving the controller along the length of slot 44 and/or rotating it with respect to bolt/screw 28 at any of the different increments of such motion along slot 44. In addition to the virtually innumerable different positions made available by the described tri-axial (three degree of freedom) motion, rotational movement of controller 10 about the axis of bolt/screw 28 also provides for a wide variety of different orientations of the controller 10 with respect to the operator of the vehicle. Thus, the attitude of controller 10 may be varied at will in a practically limitless manner, according to the desires of the operator. Of course, it is important that the bolt/screw 28 and threaded aperture 32 of slide member 22 be sufficiently strong to permit them to be tightly screwed together at selected positions of adjustment, so as to preclude relative motion between the controller 10 and mounting apparatus 14 by in effect clamping the outer spherical wall of shell 24 between slide member 22 and the corresponding spherical depression or recess 26 in the adjacent side of controller 10, by use of a screwdriver. Of course, the interfit between these slidable components may be such that a certain degree of friction is provided between these parts, while nonetheless permitting slidable repositioning by slightly loosening bolt/screw 28 and applying a small amount of force to the controller with respect to the mounting apparatus.

As noted earlier above, the particular embodiment just described represents a preferred embodiment of the underlying concept; however, various other such embodiments as well as modifications and variations in this preferred embodiment will no doubt suggest themselves to those skilled in the art upon considering the foregoing disclosure. In this regard, however, it is to be noted that the novel mounting apparatus provided herewith is also potentially of great usefulness with controllers or other such devices that do not have an integral spherical recess 26 or the like if a corresponding adapter element is provided. This may take the form of a disk-like member to be disposed between the mounting apparatus 14 and a controller or other such device of different external configuration, such adapter having the desired spherical recess (or at least a circular opening) on one side, for receiving the outside of shell 24, and on its opposite side having whatever configuration is needed to complement and nest against the outer case configuration of the controller which is desired to be so mounted. Of course, such adapter should also include an aperture or passage for the bolt/screw 28, or other such mechanical securement configuration.

All such modifications and variations should be deemed included within the concept of the invention unless stated otherwise. Thus, the scope of the invention should be deemed to include the underlying concept, the novel arrangement and assembly of parts comprising the preferred embodiment of the mounting apparatus itself, together with analogous other such components, and the novel integration of controller case configuration and mounting apparatus exterior configuration, as described above or as otherwise may be provided, together with the more universal type of assembly utilizing an adapter element as above described. All such components and subcombinations, combinations are thus considered to be included within the invention provided.

The invention claimed is:

1. An adjustable mounting apparatus for mounting an operator-controllable device on a vehicle so as to be variably positionable by an operator, comprising in combination:

a positioner member having an outer wall with an external surface of spherically curved configuration, an opening extending through said wall, and a space behind said wall;

a receiver associated with said device, said receiver having an outer surface which slidably and cooperatively interfits against said spherically curved external surface of said positioner member wall;

a position-locking element movably disposed in said space behind said wall in alignment with said opening;

a connector having portions extending from said receiver through said positioner member opening and engaging said position-locking element to releasably lock said receiver and positioning member in selected relative positions, and an accessible element associated with said connector for selective locking and releasing of said receiver and positioning member; and an attachment structure associated with said positioner member whereby said positioner member is securable to a vehicle to hold said positioner member in place thereupon;

whereby release of said connector and position-locking element allows said device to be moved relative to said positioner member and vehicle by relative sliding movement of said spherically curved surfaces of said positioner member and said receiver with respect to one another, thereby varying the positioning attitude of said device with respect to said vehicle, and locking of said receiver and positioning member precludes such movement of said device to hold it in a selected position of adjustment.

2. An adjustable mounting apparatus according to claim 1, wherein said positioner member comprises a convex dome, said outer wall comprising a wall forming said dome.

3. An adjustable mounting apparatus according to claim 2, wherein said outer surface of said receiver comprises a concave surface of generally spherical curvature.

4. An adjustable mounting apparatus according to claim 3, wherein said device comprises a controller mountable on a towing vehicle for operating the brakes of a towed vehicle.

5. An adjustable mounting apparatus according to claim 1, wherein said outer wall of said positioner member has an inner surface and said position-locking element is slidably disposed upon said inner surface.

6. An adjustable mounting apparatus according to claim 5, wherein said position-locking element has a surface slidably disposed upon said inner surface of said outer wall and both of said surfaces have corresponding spherical curvatures.

7. An adjustable mounting apparatus according to claim 5, wherein said connector and said position-locking element have mutually engageable portions for adjustably securing them together.

8. An adjustable mounting apparatus according to claim 7, wherein said connector comprises an elongated member which is threaded along at least a portion of its length.

9. An adjustable mounting apparatus according to claim 8, wherein said receiver has an opening and said elongated member extends through said opening.

10. An adjustable mounting apparatus according to claim 9, wherein said device has oppositely disposed and mutually spaced first and second sides and further includes a passage opening through each of said sides, said passage receiving said elongated member.

11. An adjustable mounting apparatus according to claim 10, wherein said device comprises a controller mountable on a towing vehicle for operating the brakes of a towed vehicle.

12. An adjustable mounting apparatus according to claim 7, wherein said connector comprises an elongated member and said opening in said outer wall of said positioner member defines a slot through which said elongated member is freely receivable, whereby said positioner member is rockably movable relative to said device and during such movement said elongated member moves along said slot.

13. An adjustable mounting apparatus according to claim 12, wherein said positioner member comprises a convex dome, said outer wall comprising a wall forming said dome.

14. An adjustable mounting apparatus according to claim 12, wherein said device has an outer housing with a wall to be disposed adjacent said outer wall of said positioner member, and wherein said outer surface of said receiver comprises an integral part of said outer housing wall.

15. An adjustable mounting apparatus according to claim 14, wherein said device has oppositely disposed and mutually spaced first and second sides and further includes a passage extending opening through each of said sides, said passage receiving said elongated member.

16. An adjustable mounting apparatus according to claim 15, wherein said device comprises a controller mountable on a towing vehicle for operating the brakes of a towed vehicle.

17. An adjustable mounting apparatus according to claim 5, further including at least one guide element inside said space behind said outer wall of said positioner member, said guide being slidably engageable with said position-locking element to guide its movement within said space.

18. An adjustable mounting apparatus according to claim 17, wherein said guide element comprises a wall disposed adjacent a side of said position-locking element.

19. An adjustable mounting apparatus according to claim 18, including a pair of said guide element walls spaced from one another, said position-locking element having a pair of spaced sides and being disposed between said pair of guide element walls such that said spaced sides move along and are guided by said guide element walls during movement of said position-locking element.

20. An adjustable mounting apparatus according to claim 19, wherein said position-locking element has a surface slidably disposed upon said inner surface of said outer wall and both of said surfaces have corresponding spherical curvatures.

21. An adjustable mounting apparatus according to claim 5, wherein said operator-controllable device has an enclosing housing with a wall to be disposed adjacent said outer wall of said positioner member, and wherein said outer surface of said receiver is located on said wall of said housing.

22. An adjustable mounting apparatus according to claim 21, wherein said outer surface of said receiver comprises an integral part of said housing wall.

23. An adjustable mounting apparatus according to claim 21, wherein said outer surface of said receiver comprises a spherically configured portion of said housing wall.

24. An adjustable mounting apparatus according to claim 23, wherein said outer surface of said receiver comprises a concavity formed in said housing wall.

25. An adjustable mounting apparatus according to claim 24, wherein said device has oppositely disposed and mutually spaced first and second sides and one of said sides is said wall of said housing on which said receiver outer surface is located, said device further including a passage opening through each of said sides, said connector including an elongated member, and said passage receiving said elongated member of said connector.

26. An adjustable mounting apparatus according to claim 25, wherein said device comprises a controller for operating the brakes of a towed vehicle.

27. An adjustable mounting apparatus according to claim 25, wherein said outer surface of said receiver comprises a spherically configured portion of said housing wall on which said outer surface is located.

28. An adjustable mounting apparatus according to claim 27, wherein said positioner member comprises a convex dome, said outer wall of said positioner forming said dome; and wherein said outer surface of said receiver comprises a concave surface of generally spherical curvature.

29. An adjustable mounting apparatus according to claim 1, wherein said attachment structure includes portions of said positioner member which are shaped to cooperatively receive at least one fastener member for securing said positioner member to said vehicle.

30. An adjustable mounting apparatus according to claim 29, wherein said positioner member comprises a convex dome, said outer wall forming said dome, said portions shaped to cooperatively receive at least one fastener member comprising at least one recess formed in said wall forming said dome.

31. An adjustable mounting apparatus according to claim 30, wherein said wall forming said dome has an end extremity defining an annular opening, said wall end extremity forming the base of said dome.

32. An adjustable mounting apparatus according to claim 31, further including a closure wall extending across said annular opening at the base of said dome.

33. In combination, a trailer brake controller and an adjustable-attitude mount for mounting said controller in a towing vehicle, comprising:

a brake controller unit having an outer housing and a wall associated with said housing which includes at least first and second sides;

a positioner member disposed adjacent one of said housing wall sides;

a receiver associated with one of said housing wall sides for cooperatively interfitting with at least portions of said positioner member;

a connector holding said receiver and positioner member together in said cooperatively interfitting relationship;

at least one of said positioner member and receiver including a spherically shaped surface and the other of said positioner member and receiver having a surface with a shape complementary to that of said spherically shaped surface, said spherically shaped surface and said surface with a complementary shape nestably and slidably interfitting with one another to provide a plurality of different positions of attitude adjustment for said brake controller relative to said positioner member.

34. A brake controller and adjustable-attitude mount for towing vehicles according to claim 33, wherein said wall comprises an integral part of said housing.

35. A brake controller and adjustable-attitude mount for towing vehicles according to claim 34, wherein said receiver comprises a shaped portion of said housing wall.

36. A brake controller and adjustable-attitude mount for towing vehicles according to claim 35, wherein said positioner member has an outer wall which carries said spherical shape.

37. A brake controller and adjustable-attitude mount for towing vehicles according to claim 36, wherein said spherical shape carried by said outer wall of said positioner member comprises a dome extending toward said receiver.

* * * * *